No. 615,982. Patented Dec. 13, 1898.
H. S. HALFORD.
RAILWAY SYSTEM.
(Application filed Mar. 29, 1897.)
(No Model.) 7 Sheets—Sheet 1.

Witnesses.
Albert Jones.
Samuel Percival.

Inventor.
Harry S. Halford
By his Attorneys.
Wheatley & Mackenzie

No. 615,982. Patented Dec. 13, 1898.
H. S. HALFORD.
RAILWAY SYSTEM.
(Application filed Mar. 29, 1897.)
(No Model.) 7 Sheets—Sheet 2.

Witnesses.
Albert Jones
Samuel Percival

Inventor.
Harry S. Halford
By his Attorneys.
Wheatley & Mackenzie

No. 615,982. Patented Dec. 13, 1898.
H. S. HALFORD.
RAILWAY SYSTEM.
(Application filed Mar. 29, 1897.)
(No Model.) 7 Sheets—Sheet 3.

Witnesses.
Albert Jones.
Samuel Percival.

Inventor.
Harry S. Halford
By his Attorneys.
Wheatley & MacKenzie

No. 615,982. Patented Dec. 13, 1898.
H. S. HALFORD.
RAILWAY SYSTEM.
(Application filed Mar. 29, 1897.)
(No Model.) 7 Sheets—Sheet 4.

Witnesses.
Albert Jones.
Samuel C. Percival.

Inventor.
Harry S. Halford
By his Attorneys.
Wheatley & Mackenzie

No. 615,982. Patented Dec. 13, 1898.
H. S. HALFORD.
RAILWAY SYSTEM.
(Application filed Mar. 29, 1897.)
(No Model.) 7 Sheets—Sheet 5.

Witnesses.
Albert Jones
Samuel Percival

Inventor.
Harry S. Halford
By his Attorneys.
Wheatley Mackenzie

No. 615,982. Patented Dec. 13, 1898.
H. S. HALFORD.
RAILWAY SYSTEM.
(Application filed Mar. 29, 1897.)

(No Model.) 7 Sheets—Sheet 6.

Fig. 14.

UNITED STATES PATENT OFFICE.

HARRY SEBASTIAN HALFORD, OF LONDON, ENGLAND.

RAILWAY SYSTEM.

SPECIFICATION forming part of Letters Patent No. 615,982, dated December 13, 1898.

Application filed March 29, 1897. Serial No. 629,813. (No model.)

*To all whom it may concern:*

Be it known that I, HARRY SEBASTIAN HALFORD, a subject of the Queen of Great Britain and Ireland, residing at Nevern Square, Earl's Court, Kensington, London, England, have invented certain new and useful Improvements in Railway Systems, (for which I have obtained Letters Patent in Great Britain, No. 8,868, dated April 27, 1896, and in France, No. 264,503, dated February 27, 1897;) and I do hereby declare the following to be a full, clear, and exact description of the invention, such as will enable others skilled in the art to which it appertains to make and use the same.

This invention for an improved railway system relates more particularly to elevated railways or short railways for recreation purposes or toy railways; and it consists in mounting the rails so that the ends can be raised and lowered and in successively raising the ends as the car is passing or is about to pass over the rails, so that the car is impelled forward or down the successive gradients so produced.

In carrying out this invention in the case of a single overhead rail, in which two compartments are suspended from each trolley running on the rails, one on either side, the trolley is arranged to automatically control hydraulic apparatus by which the rails are successively elevated immediately before the trolley passes over it. The hydraulic apparatus is supplied with power from a main running parallel to the rails and immediately under the rails.

In a railway for recreation purposes the rails are elevated by man, animal, or other suitable power apparatus, and such apparatus may be controlled automatically or by an attendant.

In a toy railway the rails are jointed together and are successively raised as the car is passing over the same by means of levers operated by the player.

In the accompanying sheet of illustrative drawings.

Referring to Figs. 1 to 6, the overhead rails 1 are rabbeted or mortised at their ends, so as to form a flush joint, and are secured together by a pin 2, passing through an elongated hole in one end to allow a slight sliding motion of one end on the other. The ends of each of the rails to be elevated are supported overhead by means of a pillar 3, fixed at its upper end to the pin 2. The pillar 3 is divided into two parts connected together by a spring 4, that allows of a certain independent motion of the two parts, and its lower part is connected to a piston 5, working in a hydraulic cylinder 6, that sustains the weight of the rails. The upper part of the pillar has a projection 22 sliding in a hole in the lower part and serving as a guide to keep the two parts in line. The cylinder 6 is connected by the passage 9 to the valve-box 10, communicating by the passage 11 with the hydraulic main 12 and having an exhaust-outlet 13. Within the valve-box 10 is an equilibrium-valve consisting of two pistons 14 and 15, rigidly connected together and to the valve-rod 16. The valve-rod 16 is provided with a pin working in a slot 17 in a link 18, jointed to the rail 1. The port of the passage 9 is arranged between the ports of the passages 11 and 13 and is, when the rails are in their normal or level position, as shown, just covered by the lower piston 15, with the pin on the valve-rod 16 bearing against the upper end of the slot 17. The lower end of the slot 17 or an adjustable stop in the slot is so arranged that when the rail is raised to its working position it bears against the pin on the valve-rod 16, the valve being in the position shown.

Figure 1:
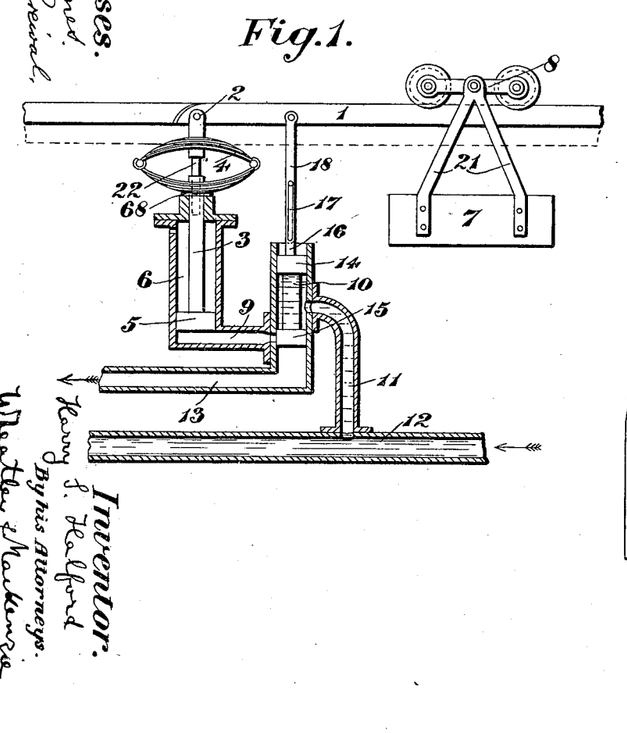
Figure 1 is a general view of a single-rail overhead railway constructed according to this invention and in which the hydraulic apparatus is controlled by the extra weight of the car on the rail supported by a spring, the compression or extension of the spring controlling the admission and exhaust of the valve of the hydraulic raising-cylinder.
Figure 2:
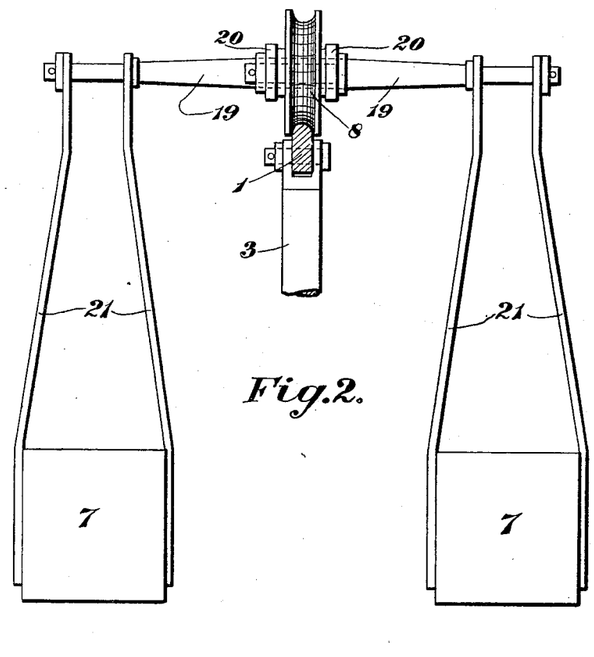
Fig. 2 is an end elevation showing the method of suspending the cars from the rail.
Figure 3:
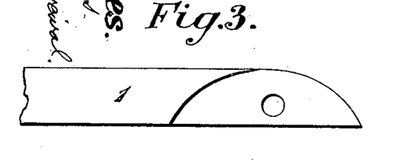
Figs. 3, 4, 5, and 6 are detail views, on an enlarged scale, showing the method of jointing together the ends of the rails.
Figure 4:
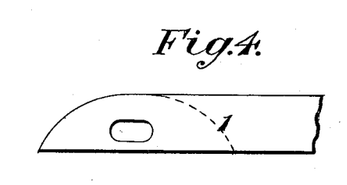
Figures 5, 6:
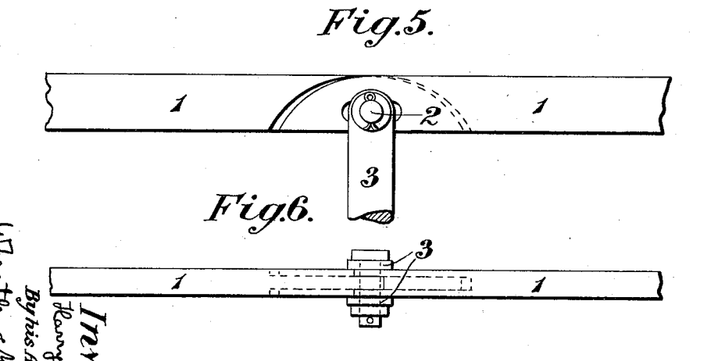

The car 7 is suspended from the trolley 8, Fig. 2, which runs on the rails 1. The suspending bar or beam 19 is attached to the side frames 20 of the trolley 8 and carries at its extremities the suspending-frames 21, to which the cars or carriers 7 are attached.

The operation is as follows: The normal position of the rails is horizontal and with the raising and controlling apparatus as shown in the drawings. In this position the rail is supported by the spring 4, bearing on a collar 68 on the lower part of the pillar. When the car passes along the rail, the extra weight of the car 7 and its contents lowers the rail, compressing the spring 4 and forcing down the link 18 and with it the valve-rod 16 and double valve. The piston 15 of the valve then uncovers and descends below the port of the passage 9, so that the water is free to pass from the main 12 to the cylinder 6 and force up the piston and with it the rails. As the rails reach their elevated position the link 18 draws up the valve-rod 16 until the port of the passage 9 is again covered by the piston 15 and shuts off the hydraulic pressure. It will readily be seen that the weight of the carriage acts on the controlling mechanism before it arrives over the main hydraulic cylinder, so as to allow time for the rail to be raised up by the said cylinder. The carriage has thus to run down the incline of the next rail and in so doing acquires the impetus for its propulsion. As the carriage passes down the next rail its weight is taken off the pin 2, and the spring 4 causes the rail to rise and with it the link 18, valve-rod 16, and valve, causing the lower piston 15 to rise above the port of the passage 9, so that the passage 9 is connected to the exhaust 13. The main cylinder being thus open to the exhaust, the piston, and with it the rails, drop to the position shown in Fig. 1, and at the termination of this descent the upper end of the groove 17 in the link 18 comes against the pin of the valve-rod and forces the valve to its normal position, as shown, again closing the port of the passage 9.

It will readily be understood that the hydraulic valve instead of being operated, as described, by the sinking and raising of the rails may be operated by the car as it passes certain points.

Figure 7:
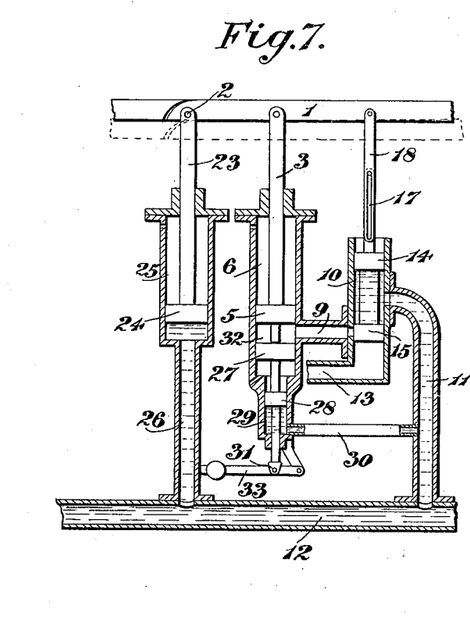
Fig. 7 is a similar view to Fig. 1, showing a modification of the controlling apparatus, in which the spring is replaced by a small hydraulic cylinder and in which the weight of the rail is counterbalanced by the hydraulic pressure.

In the modification shown in Fig. 7 the joints 2 of the rails 1 are connected to the rod 23 of the piston 24 of the hydraulic cylinder 25, the piston being of such size that it almost supports the weight of the rails to be raised, the piston being always subjected to the hydraulic pressure through the pipe 26. The rod 3 of the piston 5 of the raising-cylinder 6 is connected directly to the rails 1, but is considerably smaller than shown in Fig. 1, as it has only to provide the excess power to raise the rails and the weight of the carriage. In the lower end of the cylinder 6 is another piston 27, that is connected to a smaller piston 28, working in an extension 29 of the cylinder 6 and always subjected to the hydraulic pressure admitted through the pipe 30. The space between the pistons 27 and 28 is open to the atmosphere, and the motion of the pistons is limited in either direction by the bottom of the cylinder 6 and by the stop 31. The piston 5 is provided with a tail 32, against which the piston 27 is forced by the hydraulic pressure when the piston 5 is in the position shown and supports it in that position, the piston 28 being of sufficient size as to rather more than balance the excess weight of the rails—that is, part of the rails not balanced by the cylinder 24—but not sufficient to balance the excess weight of the rails and also the carriage. The exact adjustment necessary is obtained by the adjustably-weighted lever 33, that tends to draw down the pistons 27 and 28.

The operation is as follows: When the car passes along the rail, the extra weight of the car and its contents depresses the piston 5 and by means of the tail 32 the pistons 27 and 28. At the same time the valve 14 15 is operated, as described with reference to Fig. 1, to admit the pressure to the raising-cylinder and raise the rails, the pressure being shut off again exactly as described in Fig. 1, the pistons 27 28 being meanwhile kept depressed by the hydraulic pressure acting on the large area 2. When the carriage has passed the rails, the weight is off the rail, and the pressure, acting on the small piston 28, forces up the piston 27 until the stop 31 comes against the bottom of the extension 29, and as the port of the passage 9 is closed the piston 5 is also forced up a sufficient amount to cause the rod 18 to put the valve at exhaust exactly as described in reference to Fig. 1. The rails then descend, and when they reach the position shown the passage 9 is again closed and the extension 32 rests on the piston 27 and prevents any further sinking of the rail until operated by the weight of the carriage. The extension 32 is only necessary in case of leakage past the valve 15 or pistons 5 and 27 between the passage of one carriage and the next, which may be hours and even days.

It will readily be seen that the cylinder 25 acts entirely as a counterbalance and that the whole of the water used in that cylinder to contribute toward raising the rail is returned to the hydraulic main on the descent of the rail.

Figure 8:
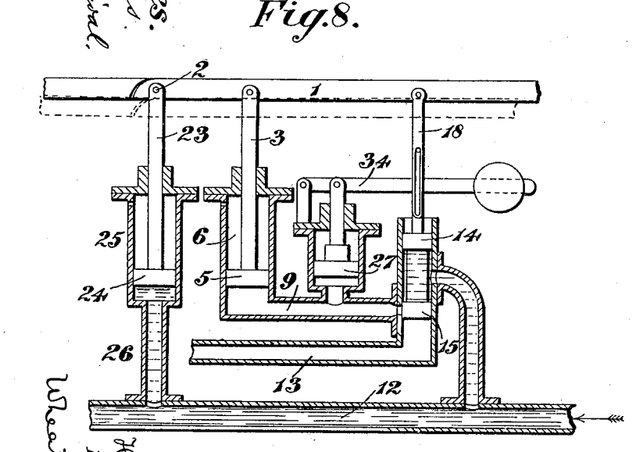
Fig. 8 shows a slight modification of the controlling apparatus shown in Fig. 7, in which the small hydraulic piston is replaced by a weighted lever.

In the modification shown in Fig. 8 the hydraulic pressure acting on the piston 28 in Fig. 7 is replaced by the weighted lever 34, the weight acting exactly as the hydraulic pressure in that figure. When the weight of the carriage comes on the rail 1, the piston 5 is depressed and raises the piston 27 and weighted lever 34, which is kept in this position by the hydraulic pressure until the rail has been fully raised, the hydraulic pressure cut off, and the carriage passed over the rail, when it descends to raise the rail slightly higher and open the cylinder 6 to the exhaust, exactly as described with reference to Figs. 1 and 7.

Figure 9:
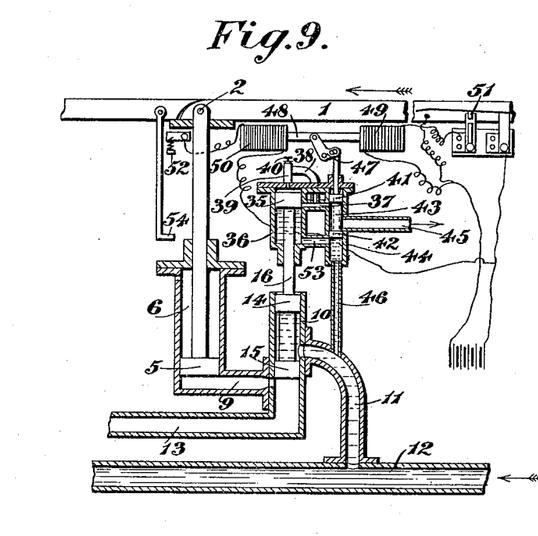
Fig. 9 shows a further modification of Fig. 1, in which the main valve is controlled by the piston of a small hydraulic cylinder that is itself controlled by electric contacts made by the passage of the car.

The modification Fig. 9 shows an arrangement in which the resistance to motion of that part of the controlling apparatus coming into direct contact with the moving car is very small. In this arrangement it is not necessary for the weight of the car to affect the position of the rails, the rail 1 having only thus the two positions—viz., the normal or lowered position and the raised position. The valve 14 15 acts to admit hydraulic pressure, cut it off, and exhaust it from the cylinder 6 exactly as described in Fig. 1, the time of the exhaust alone being slightly modified. The means for actuating the valve 14 15 are, however, different. The rod 16 of the valve 14 15 is connected to a piston 35, working in a small hydraulic cylinder 36. The port of the upper passage 37 of the cylinder 36 opens into the cylinder, so that it is just covered by the piston 35 when the valve 14 15 is in the middle position with the port of the passage 9 closed. The top of the cylinder 36 is connected to the passage 37 by a passage 38, containing a suction-valve 39, that closes upward, but which can be prevented from closing to the desired extent by means of the adjustable screw or stop 40. The valve of the cylinder 36 consists of the two pistons 41 42, connected by the hollow rod 43 and working in a cylindrical casing 44. The space between the two pistons 41 42 is always open to the exhaust 45, while the spaces at the ends of the pistons are always open to the hydraulic pressure admitted through the pipe 46 and passing through the hollow rod 43. The piston is connected to the bell-crank lever 47, operated by the sliding rod 48, controlled by the two solenoids 49 50. The circuit of the solenoid 49, which contains a source of electricity, is closed by a contact 51, operated by the wheel of the trolley as it passes along the rail 1. The circuit of the solenoid 50, which also contains a source of electricity, (which may be the same as that of the solenoid 49,) is controlled by another contact 52, operated by the rail as it rises to its highest position by the extension 54. The contact 51 is so placed as to operate the valve at the desired time as the car arrives over the joint 2 of the rails. The parts are shown in their normal position. When the wheel passes over the contact 51, the core of the solenoid 49 is attracted within it and the rod 48 is moved to the right and depresses the valve 41 42, opening the under side of the piston 35 to the exhaust through the passage 53 and admitting the hydraulic pressure to the top of the piston 35 through the suction-valve 39, which is forced fully open by the pressure, the port of the passage 37 being covered by the piston 35. The piston 35 is thus forced to descend and operates the valve 15 to admit pressure to the raising-cylinder 6, the port of the passage 37 being uncovered and the contact 51 being opened as soon as the car has passed over it. When the rail arrives at its highest position, the contact 52 is made and causes the solenoid 50 to attract its core and draw the rod 48 to the left, raising the valve 41 42 to its highest position, as shown. In this position the upper side of the piston is open to the exhaust through the passage 37, and also through the valve 39, while pressure is admitted through the passage 53 to the under side of the piston 35. The piston is thus rapidly raised until it reaches the middle of its stroke, when it closes the port of the passage 37. In this position the valve 15 cuts off the pressure to the main cylinder 6. The pressure still acting on the lower side of the piston 35, the piston is forced slowly upward as the water is forced through the suction-valve 39, that is held slightly open by the stop 40, and so slowly opens the main cylinder 6 to the exhaust. By adjusting the stop 40 the exhaust can be delayed sufficiently to insure that the car shall have passed over the raised rail before it is lowered. When the exhaust is opened, the rail lowers and breaks the contact 52. The valve 41 42 or the rod 48 may be actuated directly by the moving car instead of the solenoids.

Figure 10:
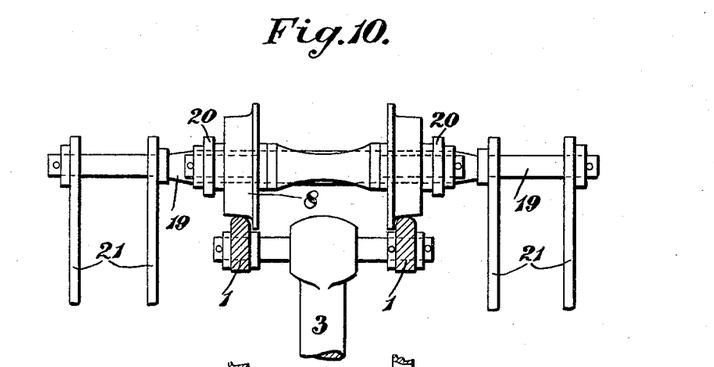
Figs. 10 and 11 are end elevations and plan showing the arrangement for suspending the cars from a double overhead railway, the two rails being raised together.
Figure 11:
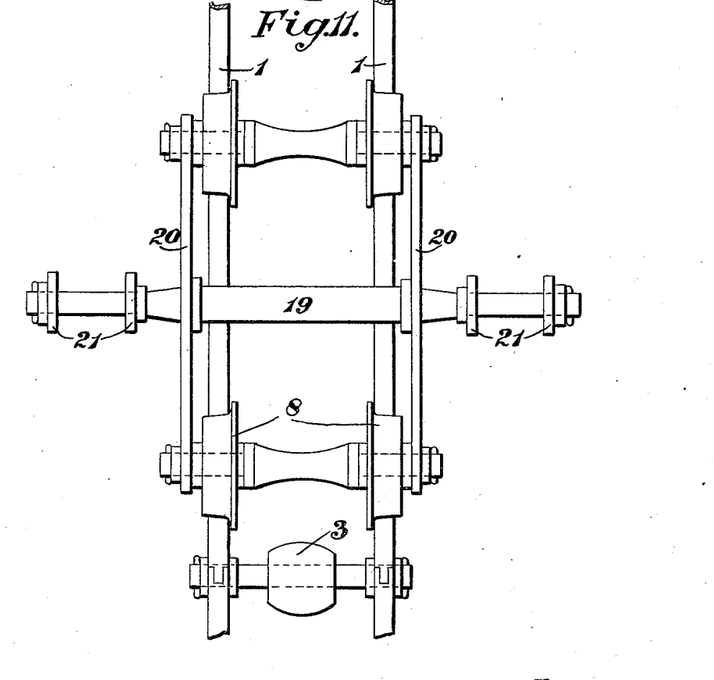

In the modification of the rails, trolley, and cars shown in Figs. 10 and 11 the two rails 1 1 are raised and lowered by the same pillar 3 and the trolley 8 is provided with two wheels running on each rail. This arrangement entirely obviates any difficulties of balancing due to the unequal weights of the cars or their contents.

Figure 12:
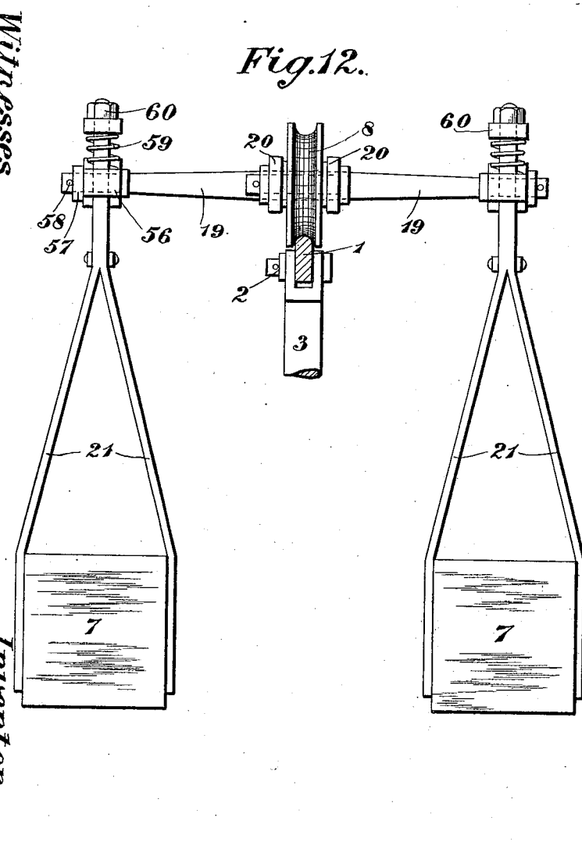
Figs. 12 and 13 show a method of supporting the car-bodies from the trolley by means of springs.
Figure 13:
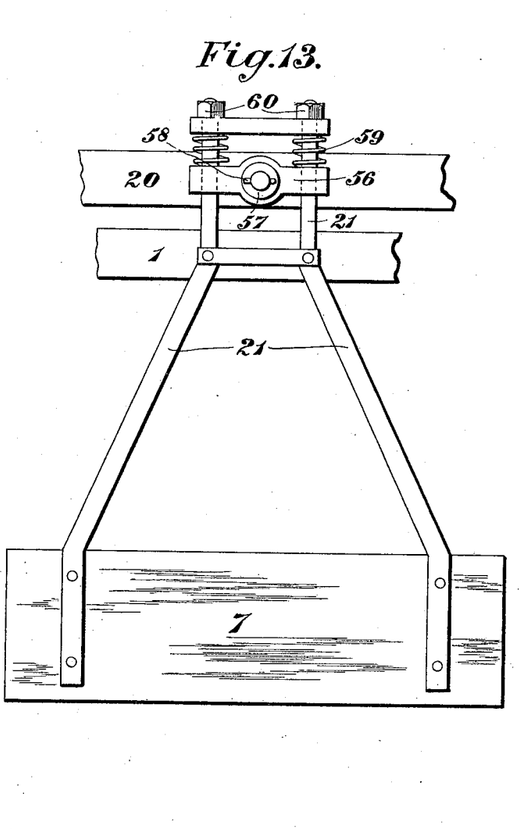

In the arrangement shown in Figs. 12 and 13 the suspending-frames 21 are suspended from the beam 19 by means of blocks 56, that are mounted on the ends of the beam 19 and are retained by the collar 57 and pin 58. The blocks 56 are free to rotate on the beam 19. The rods 21 pass through holes in the ends of the blocks 56 and are provided with the nuts 60. Springs 59 are inserted between the nuts 60 and blocks 56.

Figure 14:
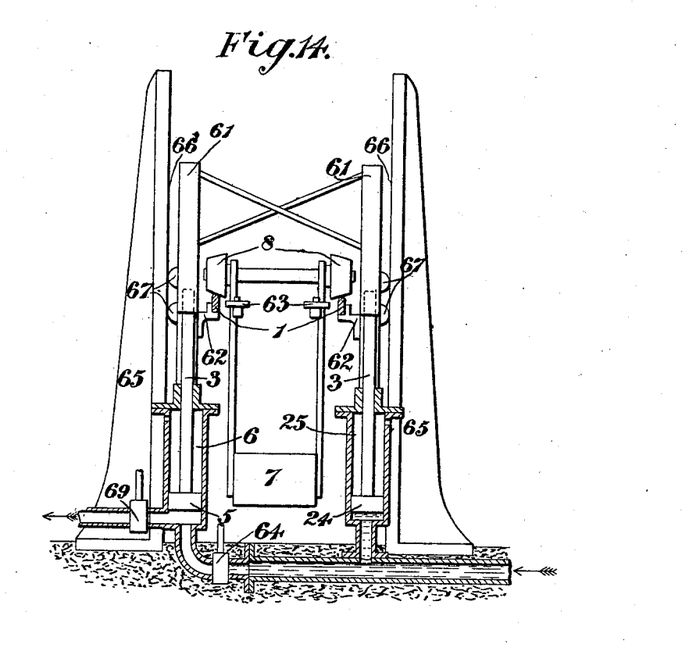
Figs. 14 and 15 show a modification of a double-rail overhead railway suitable for long spans.
Figure 15:
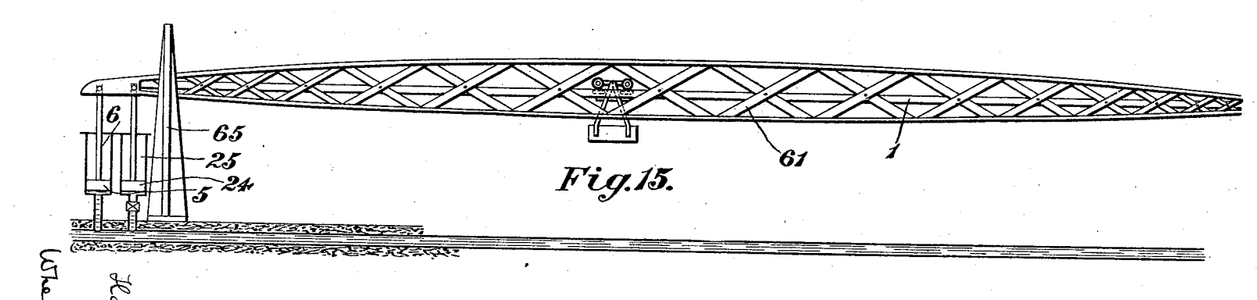

In the modification shown in Figs. 14 and 15 suitable for long spans the double rails 1 are fixed on a girder 61 by brackets 62, the running wheels 8 on the trolley being conical on the periphery and the trolley being provided with guide-wheels 63. One large car 7 only is suspended from the trolley and runs between the rails. The ends of the girders are supported by the pillars 3, connected to the pistons 5 24 of hydraulic cylinders 6 25. As shown, two cylinders 25 balance the weight of the girder and the two cylinders 6 raise the girder. As shown, the raising is controlled by the hand-cock 64 69, but any of the other arrangements shown may be employed. The ends of the girder are guided by the frames 65, the sides of the girder being provided with rollers 67, which run on the face 66 of the frames 65.

What I claim, and desire to secure by Letters Patent, is—

1. A system of railway consisting in rails, of joints connecting the adjacent ends so that such adjacent ends can be raised without affecting the other rails of vertical guide-pillars for supporting the rails at or near the joints and of means for raising the pillars.

2. A system of railway consisting of jointed rails, of pillars supporting the rails, a cylinder and piston supporting the pillar, valves for controlling the admission and exhaust of the motive fluid to the cylinder, a means for automatically actuating the admission-valve just before the car comes over the cylinder, a means for closing the admission-valve when the piston is fully raised, and a means for opening the exhaust by the car leaving the rail.

3. A system of railway consisting of jointed rails, of pillars supporting the rails, a cylinder and piston supporting the pillar, valves for controlling the admission and exhaust of the motive fluid to the cylinder, a means for balancing the weight of the rails on the pillars, a means for automatically actuating the admission-valve just before the car comes over the cylinder, a means for closing the admission-valve when the piston is fully raised, and a means for opening the exhaust by the car leaving the rail.

4. A system of railway consisting of jointed rails, of pillars supporting the rails, a cylinder and piston supporting the pillar, valves for controlling the admission and exhaust of the motive fluid to the cylinder, a means for balancing the weight of the rails on the pillars, a means whereby the weight of the car acting on the counterbalanced rail depresses it and opens the admission-valve, a means for closing the admission-valve when the piston is fully raised, a means whereby when the weight of the car is off the rails it ascends and opens the exhaust.

In testimony whereof I have affixed my signature in presence of two witnesses.

HARRY SEBASTIAN HALFORD.

Witnesses:
JAMES GADD HALFORD,
ALLAN COLLINS.